(No Model.)

L. J. BENTON.
NUT LOCK.

No. 382,789. Patented May 15, 1888.

WITNESSES:
A. P. Grant
L. Douville

INVENTOR:
Louis J. Benton
BY John W. Wadersheim
ATTORNEY.

UNITED STATES PATENT OFFICE.

LOUIS J. BENTON, OF ALPINE, NEW YORK.

NUT-LOCK.

SPECIFICATION forming part of Letters Patent No. 382,789, dated May 15, 1888.

Application filed April 6, 1887. Renewed March 3, 1888. Serial No. 266,102. (No model.)

*To all whom it may concern:*

Be it known that I, LOUIS J. BENTON, a citizen of the United States, residing at Alpine, in the county of Lewis, State of New York, have invented a new and useful Improvement in Nut-Fasteners, which improvement is fully set forth in the following specification and accompanying drawings, in which—

Figure 1:
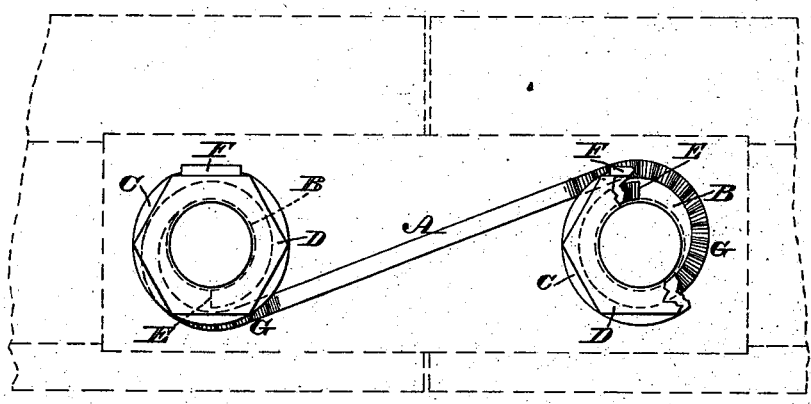
Figure 2:
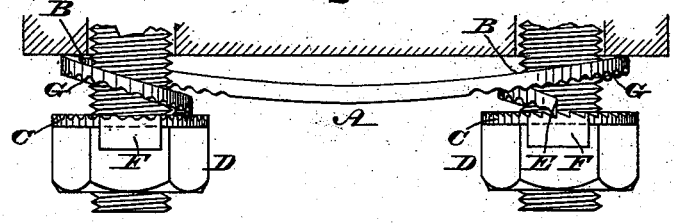

Figure 1 represents a front view of a nut-fastener embodying my invention, the same being partly broken away. Fig. 2 represents a top view thereof.

Similar letters of reference indicate corresponding parts in the two figures.

My invention relates to improvements in nut-fasteners; and it consists in employing, in connection with the nut, a spring-bar having eyes with toothed ends, and a corrugated washer with peripheral lips.

It also consists in the detail construction of parts, as herein set forth and claimed.

Referring to the drawings, A represents a bar of wrought metal with eyes B at the ends thereof, said eyes being of helical form, and said bar extending diagonally from one eye to the other and bowed outwardly.

Fitted on the bolts are washers C, which are interposed between the eyes B and nuts D, and the backs of said washers are serrated or corrugated, so as to be engaged by the ends E of the eyes B, said ends being of the form of teeth, whereby they interlock with the washers and prevent rotation of the latter when the nuts are tightened. On the periphery of the washers are lips F, which are bent over the adjacent sides of the nuts and prevent unscrewing of the latter. The outer faces of the coils of the helices are corrugated, as at G, and they interlock with the serrations or corrugations of the washers C, thus increasing the locking action of the eyes and washers. When the nuts are tightened, the coils of the eyes are compressed, and the bar is also compressed, whereby the combined pressure of the coils of the eyes and the bar is exerted against the backs of the washers, and thus the nuts are firmly held and prevented from rotation, the effect of which is evident.

Having thus described my invention, what I claim as new, and desire to secure by Letters Patent, is—

1. A nut-fastener consisting of a spring-bar having eyes with toothed ends, a corrugated washer with lips at its periphery, and a nut, substantially as described.

2. A nut-fastener consisting of a bar with helical eyes at the ends thereof, and serrated washers interposed between the nuts and eyes, the coils of the eyes interlocking with the serrations of the washers, said bar extending diagonally from eye to eye and bowed outwardly, substantially as described.

LOUIS J. BENTON.

Witnesses:
   JOHN A. WIEDERSHEIM,
   A. P. GRANT.